United States Patent

[11] 3,588,368

[72] Inventor Frank J. Potter
Webster, N.Y.
[21] Appl. No. 773,151
[22] Filed Nov. 4, 1968
[45] Patented June 28, 1971
[73] Assignee Stromberg-Carlson Corporation
Rochester, N.Y.

[54] SPACE DIVIDED LINK CIRCUIT WITH HIGH IMPEDANCE CURRENT SOURCE
5 Claims, 3 Drawing Figs.

[52] U.S. Cl. .......... 179/18
[51] Int. Cl. .......... H04g 3/50
[50] Field of Search .......... 179/18.7 (YA); 340/166

[56] References Cited

UNITED STATES PATENTS 3,251,036 5/1966 Smith .......... 179/18.7(YA)
3,343,129 9/1967 Schmitz .......... 179/18.7(YA)

*Primary Examiner*—William C. Cooper
*Assistant Examiner*—William A. Helvestine
*Attorney*—Hoffman Stone ABSTRACT: A space divided link circuit for a telephone switchboard including transistors arranged in two pairs of matrices. Each pair is coupled by a capacitor, and operating current is supplied to each matrix through the emitter-to-collector current path of a transistor in series with a diode. Off-hook conditions are detected by sensing changes in the voltage drop across the diode. The high collector impedance of the transistor minimizes shunting of the voice signals and maintains the insertion loss at a low value, while enabling the use of capacitive coupling in place of the less satisfactory transformer coupling heretofore proposed.

INVENTOR
FRANK J. POTTER

BY Hoffman Stone
ATTORNEY

INVENTOR
FRANK J. POTTER

BY Hoffman Stone
ATTORNEY

SPACE DIVIDED LINK CIRCUIT WITH HIGH IMPEDANCE CURRENT SOURCE

BRIEF SUMMARY

This invention relates to a novel, solid state, space divided link circuit for an electronic telephone switchboard or the like, and, more particularly, to a novel link circuit in which the input portion is coupled to the output portion through capacitors, and operating current is supplied through high impedance devices.

The invention may be regarded as an improvement in the link circuit described and claimed in the copending application of Barrie Brightman, Ser. No. 566,830, filed Aug. 11, 1966, now U.S. Pat. No. 3,489,856 and assigned to the present assignee. That application may be referred to for a detailed description of the operation of the link circuit, which will be described herein only to the extent needed to afford an understanding of the present invention.

In general, in the link circuit with which the present invention is concerned, transistors are arranged in cross-point matrices schematically shown as planar arrays of intersecting vertical columns and horizontal rows. Any one transistor in a matrix may be biased to saturation by the application of currents to column leads, which are connected to the bases of all the transistors in respective columns, and to row leads connected to the emitters of the transistors in the respective rows. There are four matrices, two on the calling side and two on the called side. The tip and ring leads of the subscirbers' lines are connected directly through protective diodes to the collectors of respective transistors. The tip lead of any one line is connected to one transistor in a first matrix on the calling side and to one transistor in a first matrix on the called side. Similarly, the ring lead is connected to complementary transistors on both sides of the link in second matrices. To complete a call, four transistors, two on the calling and two on the called side, are turned ON.

In the previous arrangement, the calling and called sides of the link were coupled through a transformer, and current for off-hook detection was supplied through the transformer windings in series with the windings of a conventional battery feed, or line loop current detector relay.

According to the invention, improved results are achieved by using capacitors in place of the transformer for coupling the two sides of the link, using a diode for off-hook detection, and furnishing battery current through a high impedance, constant current device such as a transistor. Preferably, base currents for the transistors at the cross-points in the matrices are also furnished through high impedance devices. Capacitive coupling provides improved transmission particularly of the high frequency components of the voice signals, and the overall arrangement serves to reduce insertion loss and to make the system less sensitive to differences in the characteristics of the various different subscirbers' lines served by the link.

DETAILED DESCRIPTION

A presently preferred embodiment of the invention will now be described in connection with the accompanying drawing, wherein.

Figure 1:
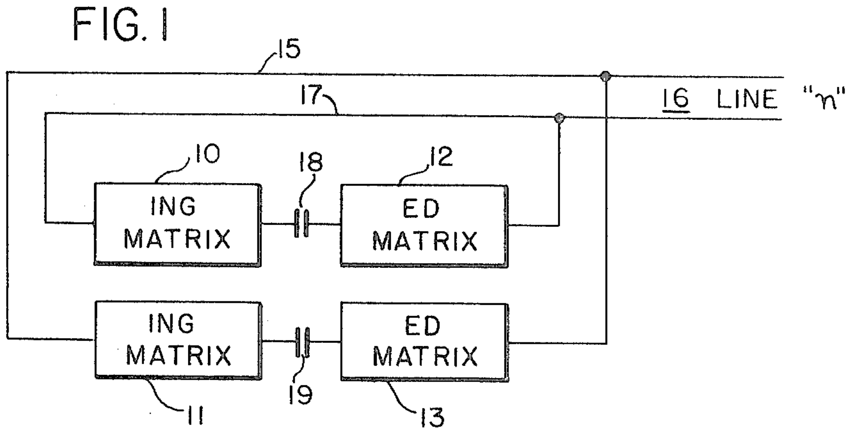
FIG. 1 is a box diagram illustrating the arrangement of matrices in a link according to the present invention.

As shown in FIG. 1, the link circuit with which the invention is primarily concerned includes four matrices 10, 11, 12, and 13, two on the calling side and two on the called side. Each of the subscribers' lines, only one 16 of which is shown, is connected to all of the matrices 10—13. The two matrices 10 and 11 on the calling side of the link are coupled respectively to the matrices 12 and 13 on the called side of the link through respective capacitors 18 and 19. To complete a connection between a calling and a called party, one cross-point in each of the matrices 10—13 is closed. The cross-points to which the calling line is connected in the calling matrices 10 and 11 are closed, and the cross-points in the called matrices 12 and 13 to which the called line is connected are also closed, so that, for voice signal transmission, the two lines are coupled through the main coupling capacitors 18 and 19.

Figure 2:
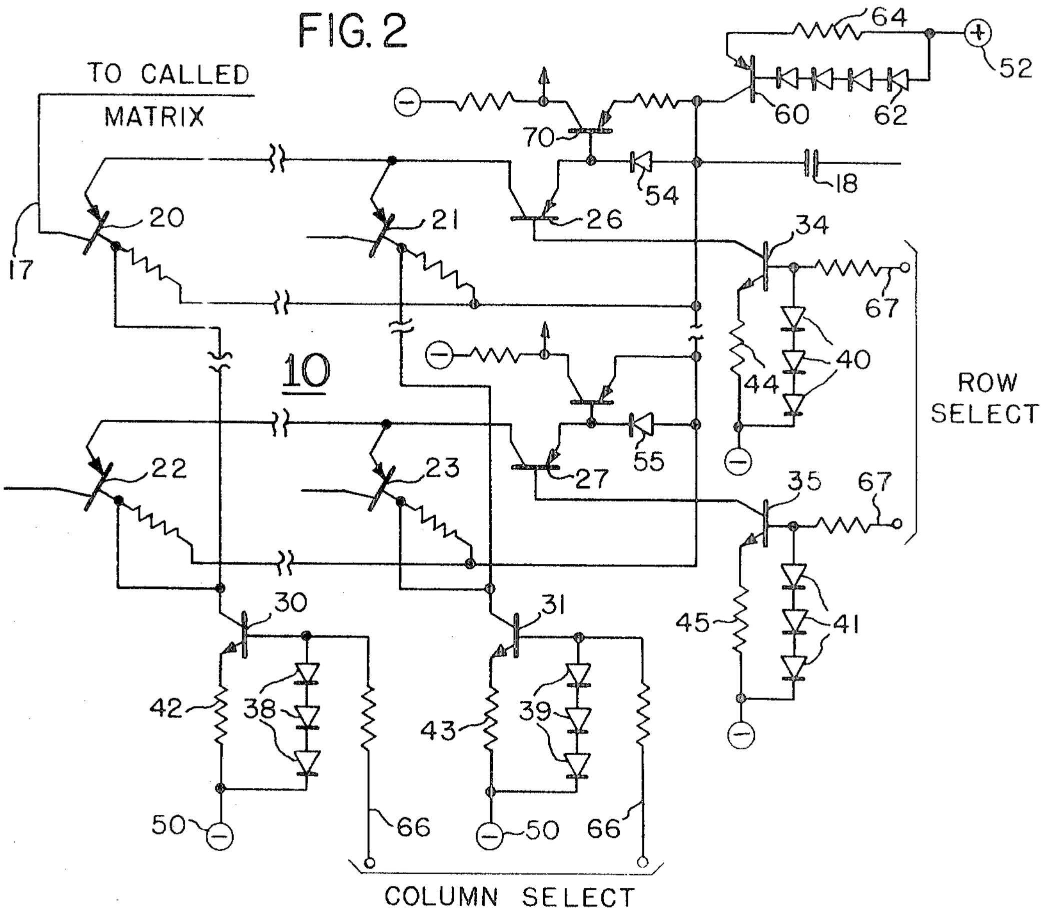
FIG. 2 is a schematic circuit diagram of one matrix on the calling side of the link shown in FIG. 1.

The first calling matrix 10 is illustrated schematically in FIG. 2. The tip leads of the subscriber's lines are connected individually to the collectors of respective cross-point transistors 20, 21, 22, and 23 in the matrix. To simply the drawing, only one tip lead 17 is The the emitters of the transistors 20—23 in each row are connected in common to the collector of a control transistor 26,27, which functions as a row selector gate and is normally biased at cutoff. The bases of the cross-point transistors 20—23 in each column are connected to a column drive transistor 30,31. The bases of the gate transistors 26 and 27 are connected respectively to the collectors of row drive transistors 34 and 35, respectively. The drive transistors 30 and 31, and 34 and 35 are normally held at cutoff by reason of the diodes 38 and 39, and 40 and 41, respectively, connected between their bases and emitter resistors 42 and 43, and 44 and 45, respectively. The number of diodes 38—41 in each chain and the values of the emitter resistors 42—45 are selected to bias the respective drive transistors 30,31 and 34,35, when appropriate signals are applied to their bases, to conduct the base current required to drive the respective cross-point transistors 20—23 and the gate transistors 26 and 27 to saturation.

Current for the cross-point transistors 20—23 is fed through the gate transistors 26 and 27, each in series with a respective diode 54 and 55, from a battery supply transistor 60, the emitter of which is connected to the positive battery terminal 52, and the collector of which is connected to the anode of the diode 54. The supply transistor 60 is biased while the link is in operation by the series diodes 62 connected between its base and its emitter resistor 64 to provide full saturation current for one of the cross-point transistors 20—23. There are four battery feed transistors 60, one for each of the matrices 10—13. They are energized at all times while the link is in service, either scanning the subscribers' lines in search of an off-hook condition, or conducting voice signals.

When one of the column select transistors 30,31 is biased in the forward direction by application of current from a control circuit (not shown) through the appropriate one of the column select leads 66, it applies a forward biasing potential on the bases of all of the cross-point transistors 20—23 in its column. When, simultaneously, one of the row select transistors 34,35 is biased in its forward direction by application of an appropriate signal to its base from the control circuit through one of the row select leads 67, it drives the gate transistor 26 or 27 to which it is connected into saturation, thereby applying a forward potential to the emitters of all of the cross-point transistors 20—23 in the selected row. The particular one of the cross-point transistors 20—23 at the intersection of the selected column and the selected row is thus driven to saturation to complete a conductive path of very low impedance between the lead 17 of the subscribers' line connected to its collector and the coupling capacitor 18. The path extends from the collector of the cross-point transistor 21—23 to its emitter, through the collector-to-emitter current path of the gate transistor 26 or 27, and through the diode 54.

The base-to-emitter circuit of a detector transistor 70 is connected across the diode 54 to provide an output signal in response to an off-hook condition. During a scanning operation, while the link is being driven to bias the cross-point transistors 20—23 successively in the forward direction, so long as the subscribers' lines are all on-hook, and matters are otherwise in order, no current flows through the cross-point transistors, because the open hook switches at the subscribers' stations are in series with the transistors 20—23. When one of the hook switches is found to be closed, however, current will flow in the corresponding one of the cross-point transistors 21—23, ard through the diode 54 or 55 in the row in which the particular cross-point transistor is connected. Current through the diode 54, in the forward direction produces a voltage drop across the diode of about 0.7 volt, which causes the detector transistor 70 to conduct strongly and produce an output signal at its collector, which may be used to actuate a relay, or otherwise, as desired by the control system to seize the link for the off-hook subscriber and to initiate succeeding operations in the exchange.

Figure 3:
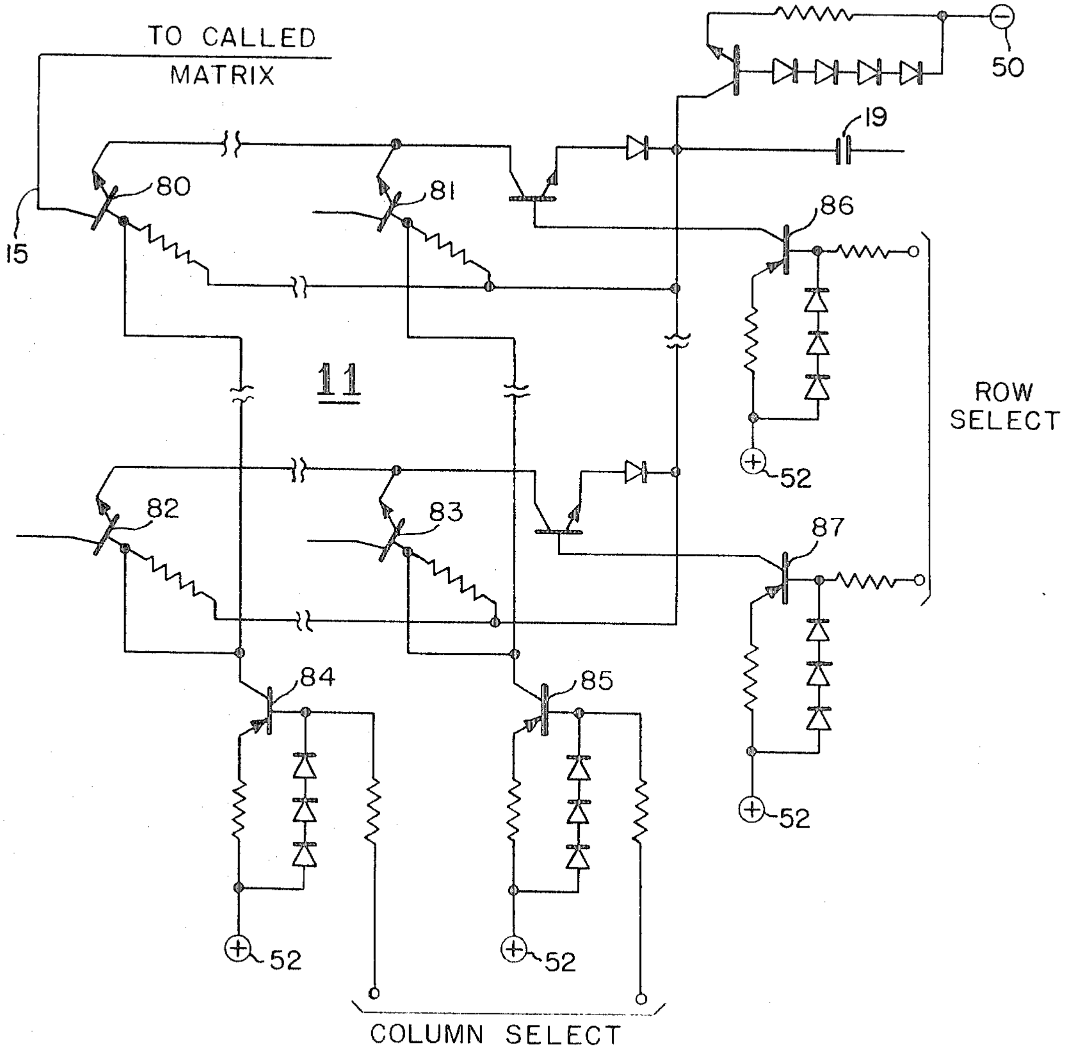
FIG. 3 is a schematic circuit diagram of the second matrix on the calling side of the link.

In the matrix 10 illustrated in FIG. 2, the cross-point transistors 20—23 and the gate transistors 26,27 are of the PNP-type and the drive transistors 30—31 and 34,35 are of the NPN-type. The situation in the second matrix 11 on the calling side, as shown in FIG. 3, is exactly symmetrical with the arrangement of the first matrix 10, allowing for the difference in polarity, in that the second matrix 11 is connected to the negative battery terminal 50. In the second matrix 11, the cross-point transistors 80, 81, 82, and 83 are of the NPN-type, and the drive transistors 84, 85, 86, and 87, respectively, are of the PNP-type. In addition, in the second matrix 11, the off-hook detector transistors 70 are omitted.

The arrangement of the called matrices 12 and 13 is exactly symmetrical with the calling matrices 10 and 11, as may be seen by reference to the hereinabove identified Brightman application.

The practice of the invention enables the use of capacitive coupling between the calling and called matrices in place of the heretofore proposed transformer coupling. More importantly, the high impedance characteristic of the battery supply transistors 70, and of the drive transistors 30,31 and 34,35 minimizes shunt loading of the voice signal path through the link, and reduces the insertion loss to an extremely low value.

I claim:

1. In a link circuit for use in a telephone switching system or the like of the kind including a matrix of transistors, means normally biasing the transistors at cutoff, and means for selectively biasing individual ones of the transistors to saturation, the improvement comprising a battery feed transistor with its emitter-to-collector current path in series between the current source and all of the transistors of the matrix, and biasing means for constantly biasing said battery feed transistor toward saturation.

2. A link circuit for use in a telephone switching system or the like comprising:

a. a matrix of transistors connected in accordance with intersecting vertical columns and horizontal rows;
b. gate transistors, one for each row of said matrix, the collectors of said gate transistors being respectively connected to the emitters of all of said transistors in respective rows of said matrix;
c. a battery feed transistor having its collector connected to the emitters of all said gate transistors;
d. means for connecting the emitter of said battery feed transistor to a terminal of a source of direct current and for biasing it constantly toward saturation;
e. means for normally keeping said gate transistors cut off and for selectively biasing them individually to saturation; and
f. means for normally keeping said transistors of said matrix cut off and for selectively applying base current to them individually to bias them to saturation.

3. A link circuit according to claim 2 wherein said means for biasing said gate transistors to saturation and said means for biasing said matrix transistors to saturation comprise devices having high impedance and constant current characteristics.

4. A link circuit according to claim 2 wherein said means for biasing said gate transistors to saturation and said means for biasing said matrix transistors to saturation comprise transistors with their collectors connected respectively to the bases of said gate and of said matrix transistors, and with their emitters connected to a terminal of a source of direct current.

5. A link circuit according to any of claims 1, 2, 3, and 4 comprising four matrices, a first capacitor connected between first and second ones of said matrices for transmitting alternating current signals between them, and a second capacitor connected between the other two of said matrices for transmitting alternating current signals between them.